United States Patent [19]

Ueda et al.

[11] Patent Number: 5,306,682
[45] Date of Patent: Apr. 26, 1994

[54] PROCESS FOR THE REGENERATION OF COKE-DEPOSITED, CRYSTALLINE SILICATE CATALYST

[75] Inventors: Masaaki Ueda, Yokohama; Teruo Murakami, Chigasaki; Shunji Shibata, Kawasaki; Kazuo Hirabayashi, Yokohama; Tadami Kondoh, Ebina; Kohji Adachi, Tokyo; Nobuko Hoshino; Shinichi Inoue, both of Yokohama, all of Japan

[73] Assignee: Research Association for the Utilization of Light Oil, Japan

[21] Appl. No.: 993,848

[22] Filed: Dec. 21, 1992

[51] Int. Cl.$^5$ .............. B01J 29/38; B01J 38/14; C07C 15/00; C10G 35/06
[52] U.S. Cl. ............... 502/52; 208/135; 502/38; 502/51; 585/407; 585/415
[58] Field of Search .............. 502/52, 38, 51

[56] References Cited

U.S. PATENT DOCUMENTS

| | | | |
|---|---|---|---|
| 4,259,176 | 3/1981 | Blanton et al. | 208/120 |
| 4,280,898 | 7/1981 | Tatterson et al. | 208/119 |
| 4,724,271 | 2/1988 | Martindale et al. | 585/415 |
| 4,835,129 | 5/1989 | Travers et al. | 502/37 |
| 4,973,778 | 11/1990 | Harandi et al. | 585/415 |
| 5,001,095 | 3/1991 | Sechrist | 208/140 |
| 5,043,057 | 8/1991 | Boyle | 208/140 |
| 5,155,075 | 10/1992 | Innes et al. | 502/52 |
| 5,202,513 | 4/1983 | Kanai | 585/415 |

FOREIGN PATENT DOCUMENTS 162251 11/1985 European Pat. Off. .
283343 9/1988 European Pat. Off. .

Primary Examiner—Paul E. Konopka
Attorney, Agent, or Firm—Lorusso & Loud

[57] ABSTRACT

A crystalline silicate catalyst having deposited coke thereon is regenerated by being contacted with an oxygen-containing gas having a moisture content of 0.2% by volume or less at a temperature of 400°–600° C.

7 Claims, 1 Drawing Sheet

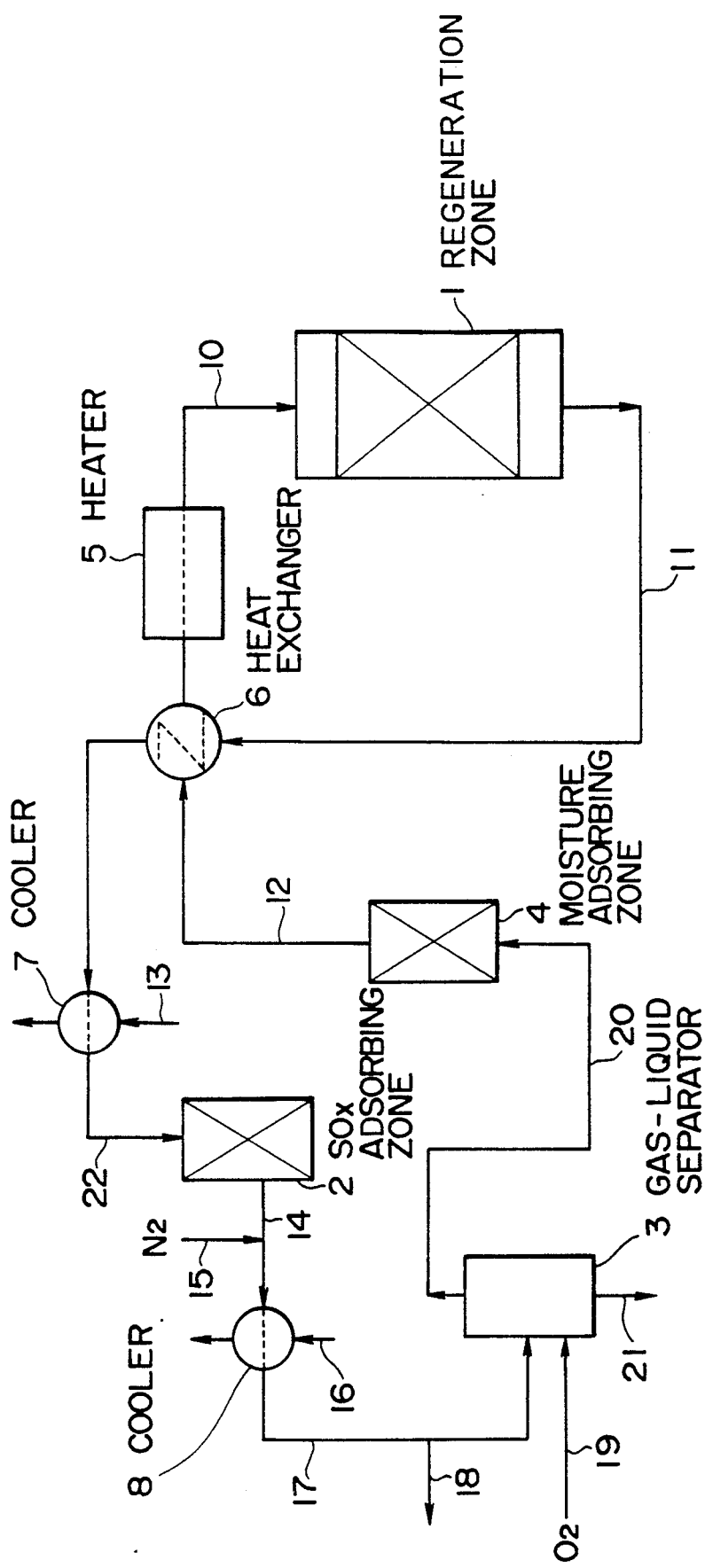

PROCESS FOR THE REGENERATION OF COKE-DEPOSITED, CRYSTALLINE SILICATE CATALYST

BACKGROUND OF THE INVENTION this invention relates generally to a process for the regeneration of a spent catalyst and, more specifically, to a process for the regeneration of a coke-covered crystalline silicate catalyst.

Crystalline silicate catalysts are now used in a wide variety of applications such as for the catalytic conversion of paraffins and/or olefins with 2-7 carbon atoms into aromatic hydrocarbons, for the catalytic conversion of methanol or dimethyl ether into lower olefins and for the disproportionation of toluene. These reactions are generally performed at a temperature of 300° C. or more. During use, such silicate catalysts are gradually inactivated because of deposition of coke on the catalyst surfaces. Regeneration of the spent catalysts has been hitherto performed by burning the coke. The conventional regeneration method, however, has a problem because the catalytic activities are considerably lowered upon repeated regeneration treatment.

SUMMARY OF THE INVENTION

The present invention has been made with the above problem in view. In accordance with one aspect of the present invention there is provided a process for the regeneration of a crystalline silicate catalyst having deposited coke thereon, comprising contacting an oxygen-containing gas having a moisture content of 0.2% by volume or less with the crystalline silicate catalyst at a temperature of 400°-600° C. to burn the coke.

In another aspect, the present invention provides a process for the regeneration of a crystalline silicate catalyst having deposited coke thereon, comprising the steps of:

(a) contacting a first, oxygen-containing gas with a moisture adsorbent to obtain a second, oxygen-containing gas having a moisture content of 0.2% by volume or less;

(b) contacting the second gas with the crystalline silicate catalyst at a temperature of 400°-600° C. to burn the coke and to obtain a waste combustion gas; and (c) recycling at least part of the waste combustion gas to step (a) as at least part of the first gas.

BRIEF DESCRIPTION OF THE DRAWINGS

FIG. 1 is a flow diagram schematically showing an apparatus suitable for carrying out the process of the present invention.

DESCRIPTION OF THE PREFERRED EMBODIMENTS

Any known crystalline silicate (zeolite) catalysts may be used for the purpose of the present invention. Such silicate catalysts include silicates and metallosilicates. Examples of the metals of the metallosilicates include Ga, Fe, Ti, Cr, B, Rh, In and Sc. Illustrative of suitable metallosilicates are an aluminosilicate, a gallosilicate, an aluminogallosilicate, an aluminoferrosilicate and a galloferrosilicate. Proton-type ZSM-5, a proton-type aluminosilicate of an MFI structure having loaded thereon Ga by impregnation or ion-exchange, a proton-type gallosilicate of an MFI structure, a proton-type or ammonium-type aluminogallosilicate of an MFI structure modified by treatment with steam, and a proton-type, crystalline aluminogallosilicate have been used as conversion catalysts and are used for the purpose of the present invention. Compositions and properties of these crystalline silicates are well known in the art.

Especially suitably used for the regeneration process of the present invention are catalysts composed of a binder and a crystalline gallosilicate or an aluminogallosilicate and used for the catalytic aromatization of aliphatic hydrocarbons. The crystalline aluminogallosilicate has a skeleton comprised of $SiO_4$, $AlO_4$ and $GaO_4$ tetrahedra and may be produced by the gel crystallization method using hydrothermal synthesis or by the method of inserting gallium into the lattice skeleton of an aluminosilicate or inserting aluminum into the lattice skeleton of a gallosilicate.

The preferred crystalline aluminogallosilicate has a skeletal structure having an aluminum content of 0.1-2.5% by weight, a gallium content of 0.1-5% by weight, a $SiO_2/(Al_2O_3+Ga_2O_3)$ molar ratio of 18-640, preferably 28-110, a $SiO_2/Al_2O_3$ molar ratio of 32-890, preferably 45-140 and a $SiO_2/Ga_2O_3$ molar ratio of 41-2,300, preferably 80-500. The aluminogallosilicate preferably has a composition represented by the following formula in terms of molar ratios of the oxides when calcined at 500° C. or higher:

$$aM_xO \; bAl_2O_3 \; Ga_2O_3 \; cSiO_2$$

wherein M represents a metal selected from the group consisting of alkali metals, alkaline earth metals and mixtures thereof, x is 2 when M is an alkali metal and 1 when M is an alkaline earth metal, a is a positive number of $(b+1)\pm 3$, preferably $(b+1)\pm 2$, b is a number of 0.04-72.0, preferably 0.5-6.0 and c is a number of 41-2,300, preferably 80-500 and wherein at least a portion of the metal M may optionally be replaced by proton.

Most preferable crystalline aluminogallosilicates are of the MFI type and/or of the MEL type. The MFI type and MEL type silicates have a structure similar to the known zeolites as described in "The Structure Commission of the International Zeolite Association" (Atlas of Zeolite Structure Types, W. M. Melyer and D. H. Olson (1978), Distributed by Polycrystal Book Service, Pittsburgh, Pa., USA).

The particle size of the crystalline aluminogallosilicate to be used in the present invention is about 0.05-20 µm. It is important that at least 80% by weight of the crystalline aluminogallosilicate should have a particle size of 0.1-10 µm in order for the catalyst to exhibit a desired activity retentivity and other catalytic activities. Preferably at least 80% by weight of the crystalline aluminogallosilicate has a particle size of 0.5-5 µm, more preferably 1-3 µm. The crystalline aluminogallosilicate is in the form of aggregated particles (secondary particles) composed of primary particles having a particle size of about 0.02-2 µm.

The above crystalline aluminogallosilicate is generally used in the form of a mixture with a binder. The binder serves to improve mechanical properties such as strength, wear resistance and moldability. Illustrative of suitable binders are alumina, silica, aluminaboria, silicaalumina and the like inorganic oxides. The content of the binder in the catalyst is generally 10-70% by weight. Addition of phosphorus to these inorganic binders can further improve mechanical strengths of the molded catalysts.

A mixture of the silicate and the binder is formulated as a cylindrical shape, a granule, a sphere, a sheet, a pellet or the like shape by means of extrusion molding, spray drying, tableting press, tumbling or an oil drop method. To facilitate the molding, an organic lubricant may be advantageously used.

The aluminogallosilicate catalyst may be subjected to activation treatments commonly adopted for conventional zeolite catalysts, as desired. For example, the silicate catalyst may be converted into an ammonium form by ion exchange in an aqueous solution containing an ammonium salt such as ammonium chloride, ammonium nitrate, ammonium fluoride ammonium hydroxide or the like. The ammonium-form catalyst may be further subjected to ion exchange treatment or impregnation treatment in an aqueous solution containing ions of a desired metal other than alkali metals and alkaline earth metals for the introduction of the desired metals into the catalyst. The aluminogallosilicate catalyst in the ammonium form may also be converted into a acid form by calcination in an atmosphere of air, nitrogen or hydrogen at 200°-800° C., preferably 350°-700° C. for 3-24 hours. The acid catalyst may be further treated with hydrogen or a mixture of nitrogen and hydrogen under the above conditions.

The above crystalline silicate catalysts are packed in a suitable catalytic conversion zone or reactor for the aromatization of olefins and/or paraffins with 2-7 carbon atoms, the conversion of methanol or dimethyl ether into lower olefins, the disproportionation of toluene or the like conversion reactions. During use, the catalysts are gradually inactivated due to the deposition of coke on the surfaces thereof.

The process of the present invention can effectively regenerate such spent catalysts. Thus, in the process of the present invention, an oxygen-containing gas having a moisture content of 0.2% by volume or less is contacted with the crystalline silicate catalyst at a temperature of 400°-600° C., preferably 420°-580° C. to burn the coke deposited on the spent catalyst. The oxygen content of the oxygen-containing gas is preferably 0.05-10% by volume, more preferably 0.1-8% by volume and may be air diluted with nitrogen or carbon dioxide to provide a predetermined oxygen concentration. Of course, the oxygen-containing gas may be a mixed gas obtained by blending nitrogen, carbon dioxide and oxygen. The contact of the spent catalyst with the oxygen-containing gas may be carried out after transport the spent catalyst contained in the catalytic conversion zone to a regeneration zone such as a combustion tower. Alternatively, the regeneration may be performed on the spent catalyst in the catalytic conversion zone.

Upon contact with the oxygen-containing gas, the coke on the spent catalyst is burnt and removed therefrom. The content of moisture in the oxygen-containing gas is preferably 300 ppm by volume (0.03% by volume) or less, more preferably 50 ppm by volume (0.005% by volume) or less. The regeneration is generally continued until the oxygen consumption is no longer detected and/or until the temperature of the zone in which the regeneration is performed is no longer increased.

By maintaining the content of moisture in the oxygen-containing gas at an extremely low level, the catalyst can be effectively regenerated without causing inactivation thereof. Inactivation of the catalyst during regeneration treatment in the conventional method is considered to be attributed to the presence of moisture; i.e. moisture is considered to interact with active sites of the catalyst to cause the inactivation thereof.

In a preferred embodiment, the regeneration of a crystalline silicate catalyst having deposited coke thereon is performed by a process including the steps of:

(a) contacting a first, oxygen-containing gas with a moisture adsorbent to obtain a second, oxygen-containing gas having a moisture content of 0.2% by volume or less;

(b) contacting the second gas with the crystalline silicate catalyst at a temperature of 400°-600° C. to burn the coke and to obtain a waste combustion gas; and (c) recycling at least part of the waste combustion gas to step (a) as at least part of the first gas.

As the moisture adsorbent used in step (a), there may be used a crystalline aluminosilicate (synthetic zeolite such as A-type zeolite), naturally occurring zeolite, diatomaceous earth, sepiolite, activated alumina, silica gel and silica alumina. Commercially available A-type zeolite (molecular sieves) may be suitably used. Step (a) is generally performed at a temperature of 15°-50° C., preferably 20°-40° C. and a pressure of ambient pressure to 10 kg/cm$^2$G.

Step (b) is generally performed at a temperature of 400°-600° C., preferably 420°-580° C., and a pressure of ambient pressure to 10 kg/cm$^2$G and with a gas hourly space velocity (GHSV) on weight basis of 300-4,000/-hour, preferably 500-3,000/hour.

In step (c), at least a portion of the waste combustion gas obtained in step (b) is recycled to step (a) as at least part of the oxygen-containing gas. Preferably, the gas to be recycled is first cooled to a temperature at which step (a) is performed and is mixed, if necessary, with a make-up oxygen gas and then fed to step (a).

When the combustion gas contains sulfur oxides such as $SO_2$ and $SO_3$ (which may be derived from sulfur accumulated on the catalyst during catalytic conversion stage), it is desirable to contact the waste combustion gas with a sulfur oxide adsorbent to remove the sulfur oxides therefrom before recycling to step (a). The sulfur oxide adsorbent may a silicate (synthetic zeolite), naturally occurring zeolite, diatomaceous earth, sepiolite, alumina, silica, silica alumina or activated carbon. The contact with the sulfur oxide adsorbent is generally performed at a temperature of 100°-200° C., preferably 120°-170° C. and a pressure of ambient pressure to 10 kg/cm$^2$G. The $SO_2$ adsorbed by the adsorbent is converted to $SO_3$ upon contact with oxygen. The $SO_3$ on the adsorbent is converted into $H_2SO_4$ upon contact with moisture which is formed in step (b) by reaction of hydrogen contained in the catalyst with oxygen. The sulfuric acid thus formed is accumulated in the adsorbent.

Referring now to FIG. 1, designated as 1 is a catalyst regeneration zone containing a spent, crystalline silicate catalyst to be regenerated, as 2 a sulfur oxide adsorbing zone containing a sulfur oxide adsorbent, as 3 a gas-liquid separator, as 4 a moisture adsorbing zone containing a moisture adsorbent, as 5 a heater, as 6 a heat exchanger, and as 7 and 8 coolers.

A first, oxygen-containing gas is introduced through a line 20 into the moisture adsorbing zone where it is brought into contact with the moisture adsorbent to remove moisture contained in the first gas and to obtain a second, oxygen containing gas having a moisture content of 0.2% by volume or less. The second gas is successively heated in the heat exchanger 6 and in the heater 5 and is introduced through a line 10 into the regeneration zone 1. In the zone 1, the second gas is contacted with the spent catalyst at a temperature of 400°-600° C. so that the coke deposited on the catalyst is burnt and is converted into CO and $CO_2$. The hydrogen and sulfur if present on the catalyst are also converted into $H_2O$ and sulfur oxides, respectively.

The combustion gas containing CO, $CO_2$, $H_2O$ and sulfur oxides is discharged from the regeneration zone and is fed through a line 11 to the heat exchanger 6 where it is heat exchanged with the above-mentioned second, oxygen-containing gas supplied through the line 12. The exhaust gas is further cooled in the cooler 7 by indirect heat exchange with a cooling water supplied through a line 13 and is then introduced through a line 22 into the sulfur oxide adsorbing zone 2 where the waste gas is contacted with the sulfur oxide adsorbent to fix the sulfur oxides as sulfuric acid.

The waste gas from which sulfur oxides have been removed is passed through a line 14 to a cooler 8 and is cooled there with a cooling medium supplied through a line 16. The cooled waste gas is then fed through a line 17 to the gas-liquid separator 3. Condensed water is discharged from the separator 3 through a line 21 while the gas is fed through the line 20 to the moisture adsorbing zone 4 as the aforesaid first, oxygen-containing gas. Designated as 18 is a line for discharging a portion of the recycling gas therethrough. Nitrogen gas and oxygen gas are supplied through lines 15 and 19, respectively, to maintain the oxygen content of the first, oxygen-containing gas in a predetermined range. The catalyst in the regeneration zone 1 is thus regenerated as the process proceeds without causing inactivation of the catalyst.

In the above process, when the aliphatic hydrocarbon feed which was contacted with the catalyst for the conversion into high octane gasoline was free of sulfur and, therefore, the resulting spent catalyst does not contain sulfur, then it is not necessary to use the sulfur oxide adsorbing zone 2.

The following examples will further illustrate the present invention.

EXAMPLE 1

Catalyst:

A catalyst composed of alumina (binder) and a crystalline aluminogallosilicate having a particle size in the range of 0.1-10 μm was prepared. The crystalline aluminogallosilicate contained a 80% by weight portion having a particle size in the range of 1-4 μm and had a $SiO_2/Ga_2O_3$ molar ratio of 186.8, a $SiO_2/(Al_2O_3+Ga_2O_3)$ molar ratio of 48.7 and a $SiO_2/Al_2O_3$ molar ratio of 65.9. The catalyst was converted into proton-form and used for the aromatization of light naphtha.

Aromatization

The catalyst was packed in a reactor and the light naphtha was allowed to be passed through the packed catalyst at a temperature of 538° C. under an ambient pressure with LHSV of 2/hour for 24 hours. The product discharged from the reactor was analyzed after 2 hours and 24 hours from the start of the reaction for the calculation of the aromatics yield R. The aromatics yield R is defined as follows:

$$R = A/B \times 100 (\%)$$

where A is the weight of the aromatic hydrocarbons contained in the product discharged from the reactor and B is the weight of the aliphatic hydrocarbons having 2-7 carbon atoms (except ethane) contained in the naphtha feed supplied to the reactor.

Regeneration

After the completion of the above 24 hours reaction, the used catalyst was subjected to a regeneration treatment using the system illustrated in FIG. 1 under the following conditions:

| Oxygen-containing gas (line 10) | |
|---|---|
| Oxygen content: | 8% by volume |
| Moisture content: | nil |
| Regeneration zone (1) | |
| Regeneration time: | 22 hours |
| Temperature: | 520° C. for the first 5 hours |
| | 570° C. for the succeeding 17 hours |
| GHSV: | 500 hour$^{-1}$ |
| Pressure: | ambient pressure |
| Combustion exhaust gas (line 11) | |
| Moisture content*: | 1 ppm by volume |

*after completion of 22 hours

The above regeneration and aromatization operations were alternetely repeated five times. The aromatics yields attained after 1, 3 and 5 repetitions shown in Table 1.

COMPARATIVE EXAMPLE 1

Example 1 was repeated in the same manner as described except that the regeneration of the catalyst was performed without using the moisture adsorbing zone 4. The oxygen-containing gas supplied to the regeneration zone had a moisture content of 3.5% by volume. The results are shown in Table 1.

TABLE 1

| | Reaction Time (hour) | Aromatics Yield (%) Catalyst (Regeneration Number) | | | |
|---|---|---|---|---|---|
| | | standard | 1 | 3 | 5 |
| Example 1 | 2 | 62.5 | 60.8 | 58.7 | 57.5 |
| | 24 | 56.0 | 54.5 | 52.7 | 51.2 |
| Comptv. Ex. 1 | 2 | 63.1 | 62.1 | 55.0 | 45.4 |
| | 24 | 57.5 | 57.5 | 48.0 | 38.0 |

EXAMPLE 2

Catalyst

A catalyst composed of alumina (binder) and a crystalline aluminogallosilicate having a particle size in the range of 0.1-2 μm was prepared. The crystalline aluminogallosilicate contained a 80% by weight portion having a particle size in the range of 0.5-2 μm and had a $SiO_2/Ga_2O_3$ molar ratio of 158.9, a $SiO_2/(Al_2O_3+Ga_2O_3)$ molar ratio of 46.1 and a $SiO_2/Al_2O_3$ molar ratio of 64.8. The catalyst was converted into proton-form and used for the aromatization of light naphtha.

Aromatization

The catalyst was packed in a reactor and the light naphtha was allowed to be passed through the packed catalyst at a temperature of 550° C. under a pressure of 3 kg/cm$^2$G with a LHSV of 1 hour$^{-1}$ for 48 hours while recycling a light hydrocarbon fraction. The product discharged from the reactor was analyzed after 14 hours and 24 hours from the start of the reaction for the calculation of the aromatics yield R.

Regeneration

After the completion of the above 48 hours reaction, the used catalyst was subjected to a regeneration treatment using the system illustrated in FIG. 1 under the following conditions:

oxygen-containing gas (line 10)
    Oxygen content: 0.05-5.0% by volume
    Moisture content: less than 1 ppm by volume
Regeneration zone (1)
    Regeneration time: 30 hours
    Temperature: 400°-550° C.
    GHSV: 2,000 hour$^{-1}$
    Pressure: 4.5 kg/cm$^2$G
Combustion exhaust gas (line 11)
    Moisture content: maximum 0.2% by volume.

The above regeneration and aromatization operations were alternately repeated nine times. The aromatics yields attained after 1, 2 and 9 repetitions are shown in Table 2.

COMPARATIVE EXAMPLE 2

Example 2 was repeated in the same manner as described except that the regeneration of the catalyst was performed without using the moisture adsorbing zone 4. The oxygen-containing gas supplied to the regeneration zone had a moisture content of 2% by volume when measured under ambient pressure. The results are shown in Table 2.

TABLE 2

| | Reaction Time (hour) | Aromatics Yield (%) Catalyst (Regeneration Number) | | | |
|---|---|---|---|---|---|
| | | standard | 1 | 2 | 9 |
| Example 2 | 14 | 57.5 | 57.5 | 57.2 | 56.9 |
| | 24 | 56.6 | 56.6 | 57.0 | 55.9 |
| Comptv. Ex. 2 | 14 | 56.0 | 49.8 | * | * |
| | 24 | 54.5 | 46.4 | * | * |

*The experiment was not able to be continued because the catalyst showed no appreciable activity.

What is claimed is:

1. A process for the regeneration of a crystalline silicate aromatization catalyst consisting essentially of a crystalline aluminogallosilicate and coke deposited thereon, comprising contacting an oxygen-containing gas having a moisture content of 0.2% by volume or less and an oxygen concentration of 0.05-10% by volume with said crystalline silicate aromatization catalyst at a temperature of 420°-600° C. and at a gas hourly space velocity of 300-4000/hour to burn said coke at said temperature without inactivation of the catalyst.

2. A process as claimed in claim 1 wherein said temperature is 420°-580° C.

3. A process for the regeneration of a crystalline aromatization silicate catalyst consisting essentially of a crystalline aluminogallosilicate and coke deposited thereon, comprising the steps of:
(a) contacting a first, oxygen-containing gas with a moisture adsorbent to obtain a second, oxygen-containing gas having a moisture content of 0.2% by volume or less and an oxygen concentration of 0.05-10% by volume;
(b) contacting said second gas with said crystalline silicate aromatization catalyst at a temperature of 420°-600° C. and at a gas hourly space velocity of 300-4000/hour at said temperature without inactivation of the catalyst and to obtain a waste combustion gas; and
(c) recycling at least part of said waste combustion gas to step (a) as at least part of said first gas.

4. A process as claimed in claim 3, wherein said moisture adsorbent comprises an A zeolite or activated alumina.

5. A process as claimed in claim 3, wherein said waste combustion gas contains sulfur oxides and is contacted with a sulfur oxide adsorbent to remove said sulfur oxides therefrom before recycling to step (a).

6. A process as claimed in claim 5, wherein said sulfur oxide adsorbent comprises activated carbon.

7. A process as claimed in claim 3 wherein said temperature is 420°-580° C.

* * * * *